(No Model.)
A. DELOTTER.
VEHICLE SEAT.
No. 497,311. Patented May 16, 1893.
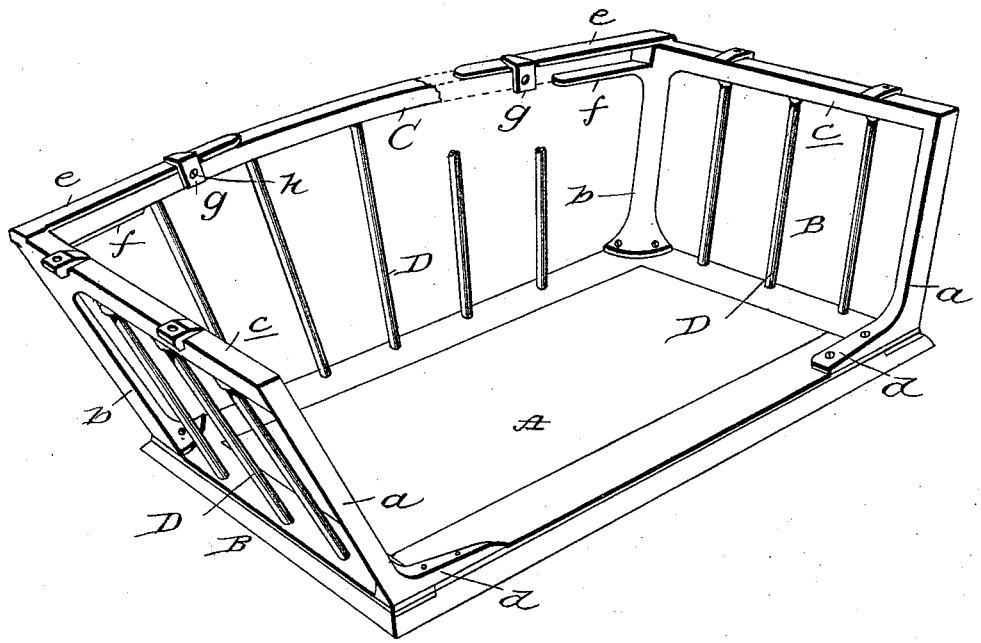

UNITED STATES PATENT OFFICE.

AARON DELOTTER, OF GOSHEN, INDIANA.

VEHICLE-SEAT.

SPECIFICATION forming part of Letters Patent No. 497,311, dated May 16, 1893.

Application filed January 21, 1893. Serial No. 459,101. (No model.)

*To all whom it may concern:*

Be it known that I, AARON DELOTTER, a citizen of the United States, residing at Goshen, in the county of Elkhart and State of Indiana, have invented certain new and useful Improvements in Vehicle-Seats; and I do declare the following to be a full, clear, and exact description of the invention, such as will enable others skilled in the art to which it appertains to make and use the same.

My invention has relation to improvements in vehicle seats, and it has for its general object to provide such a seat of a cheap, simple and exceedingly strong and durable construction.

Other objects and advantages will be fully understood from the following description and claims when taken in connection with the accompanying drawing in which the figure is a perspective view of a seat embodying my invention.

Referring by letter to the said drawing: A, indicates the base or bottom of the seat, and B, indicates the end sections which are preferably cast of iron. These end sections B, respectively comprise the forward post $a$, and the rear post $b$, which are provided with angular branches $d$, for attachment to the base or bottom A, and the rails $c$, which serve to connect the forward and rear posts as shown.

Forming part of the end sections B, and extending laterally and inwardly from the upper ends of the rear posts $b$, are parallel straps $e$, $f$, which are designed to receive the rear rail C, between them as illustrated. The upper straps $e$, which are preferably of a greater length than the straps $f$, as shown, are provided at a suitable point in their length, upon their inner side, with depending lugs $g$, through which take screws $h$, which take into the rear rail C, and serve to securely hold the same against lateral displacement. By this construction it will be seen that an exceedingly strong and durable connection is effected between the end sections and the rear rail, and one that is well able to withstand pressure and other strain, which is an important desideratum.

D, indicates the rounds or sticks of my improved seat. These rounds or sticks are seated and secured in any approved manner in recesses formed in the base or bottom and the end and rear rails of the seat.

It will be seen from the foregoing description that my improved seat may be very easily constructed; that it is exceedingly strong and durable and that it may be put together without the employment of skilled labor which is highly desirable.

In the foregoing description I have specifically described the construction and relative arrangement of the parts of my improved seat, in order to impart a full and clear understanding of the same, but I do not desire to be confined to such specific construction as such changes or modifications may be made in practice as fairly fall within the scope of my invention.

Having described my invention, what I claim, and desire to secure by Letters Patent, is—

1. In a vehicle seat, the combination of the end sections comprising the forward post, the rear post, the rail connecting the posts and the parallel straps extending laterally inward from the rear posts, the rear rail seated between the straps of the end sections, and a suitable means for securing said rail in position, substantially as specified.

2. A vehicle seat comprising the following elements, viz: the base or bottom, the end sections connected to the base or bottom and comprising the front and rear posts, the rail connecting said posts and the parallel straps extending inwardly from the rear posts, the rear rail seated and secured between the said straps, and the rounds connecting the bottom or base and the rear and end rails, substantially as specified.

In testimony whereof I affix my signature in presence of two witnesses.

AARON DELOTTER.

Witnesses:
JOSEPH KLICK,
JOEL H. AUSTIN.